United States Patent [19]
Caveney et al.

[11] 3,908,233
[45] Sept. 30, 1975

[54] RELEASABLE ONE-PIECE CABLE TIE

[75] Inventors: Jack E. Caveney, Chicago; Roy A. Moody, Flossmoor, both of Ill.

[73] Assignee: Panduit Corporation, Tinley Park, Ill.

[22] Filed: July 3, 1969

[21] Appl. No.: 838,908

[52] U.S. Cl. .............................................. 24/16 PB
[51] Int. Cl.² ........................................ B65D 63/00
[58] Field of Search .......... 24/16 PB, 73.7, 30.5 PB, 24/73 PB, 30.5 P; 248/74 PB, 74, 68

[56] References Cited
UNITED STATES PATENTS

| | | | |
|---|---|---|---|
| 2,936,980 | 5/1960 | Rapata | 248/74 PB |
| 3,009,220 | 11/1961 | Fein | 24/16 PB |
| 3,114,184 | 12/1963 | Bigaouette | 24/30.5 PB |
| 3,127,648 | 4/1964 | Emery | 24/16 PB |
| 3,214,808 | 11/1965 | Litwin | 24/16 PB |
| 3,224,056 | 12/1965 | Joffe | 24/16 PB |
| 3,302,913 | 2/1967 | Collyer et al. | 248/74 PB UX |
| 3,339,246 | 9/1967 | Geisinger | 24/16 PB |
| 3,368,247 | 2/1968 | Orban | 24/16 PB |
| 3,463,427 | 8/1969 | Fisher | 248/68 |
| 3,471,109 | 10/1969 | Meyer | 248/68 |
| 3,486,201 | 12/1969 | Bourne | 24/16 PB |
| 3,494,002 | 2/1970 | Kabel | 24/16 PB |
| 3,542,321 | 11/1970 | Kahabka | 248/68 R |

*Primary Examiner*—Donald A. Griffin
*Attorney, Agent, or Firm*—Prangley, Dithmar, Vogel, Sandler & Stotland

[57] ABSTRACT

This invention is directed to a releasable integral one-piece cable tie to be tensioned about a bundle of wires and the like, the cable tie comprising an elongated flexible strap, a row of teeth disposed on one longitudinal surface of the strap and arranged transversely with respect thereto, a frame integral with one end of the strap and including an abutment wall, the frame having an entry surface and an exit surface and a strap-receiving opening extending therethrough, a pawl disposed within the frame in the strap-receiving opening and hingedly connected thereto, the abutment wall having a strap-bearing surface disposed toward the pawl and defining therewith a strap-receiving throat, a set of transverse teeth on the pawl disposed toward the abutment wall and shaped complementary to the row of teeth on the strap, and an extension on the pawl extending beyond the exit surface in all positions of the pawl for engagement by a user to move the pawl.

14 Claims, 13 Drawing Figures

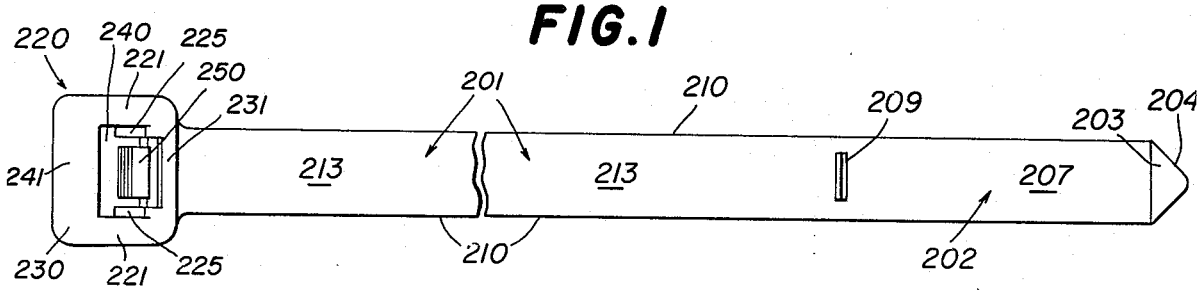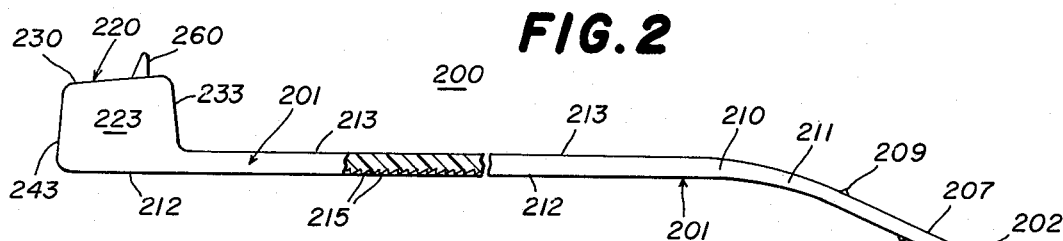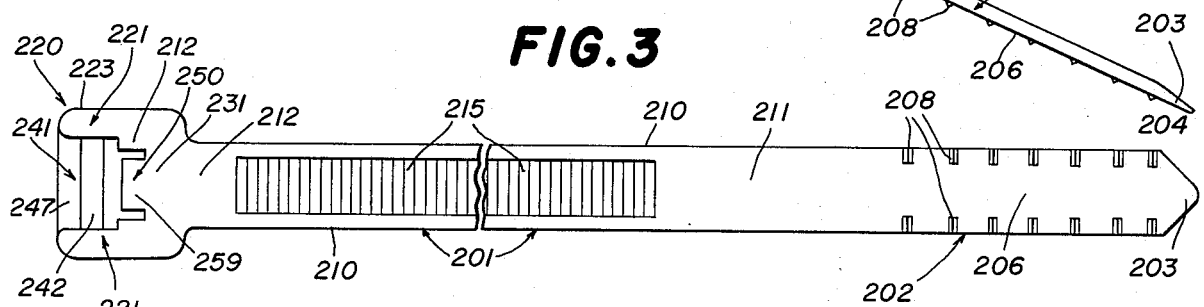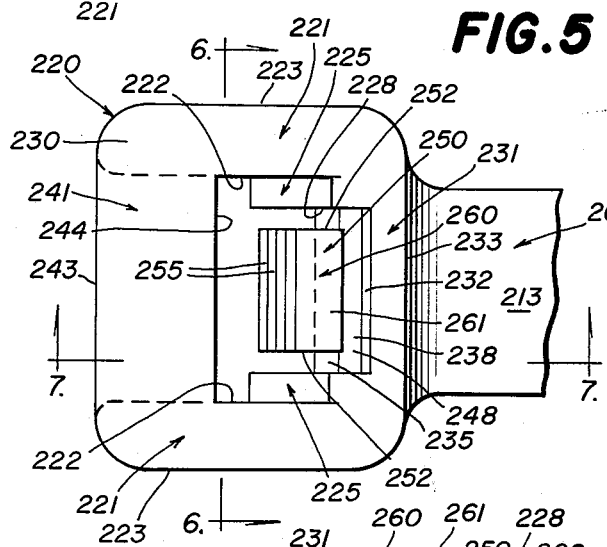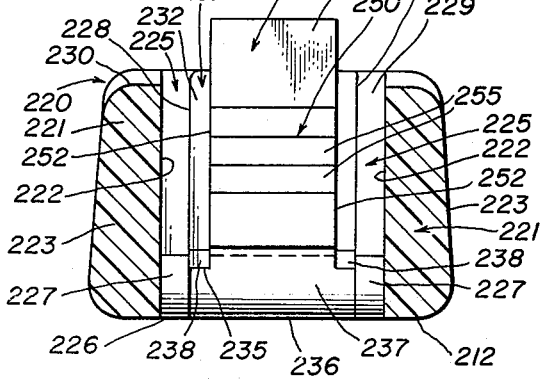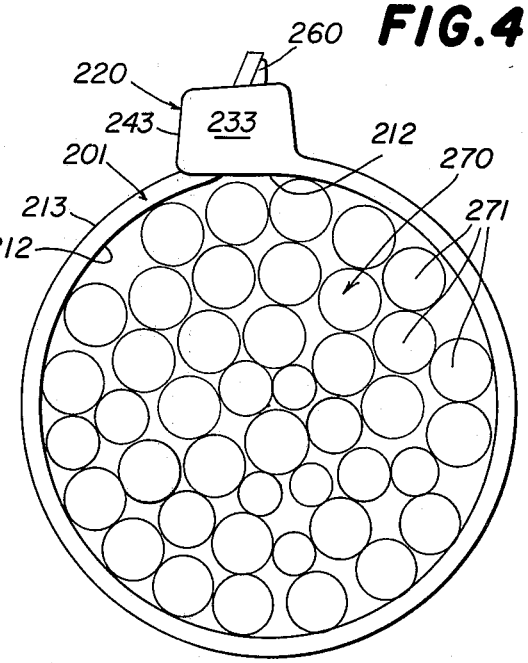
INVENTORS
JACK E. CAVENEY
ROY A. MOODY

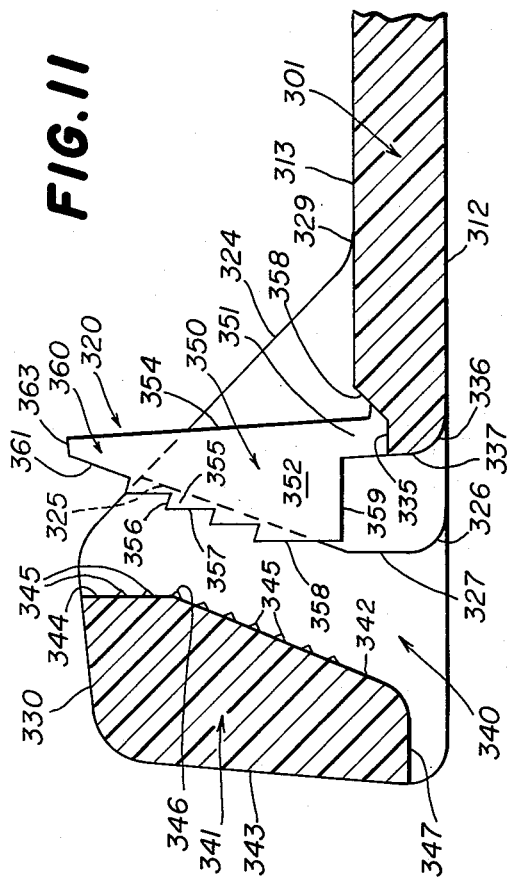
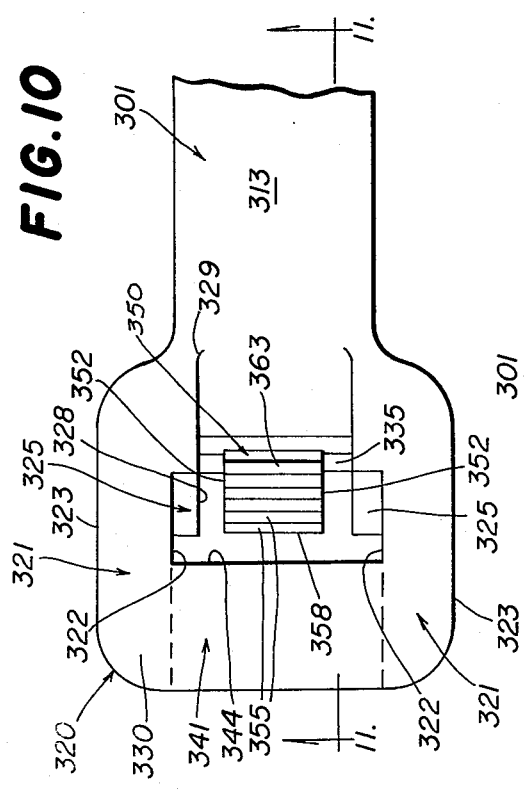
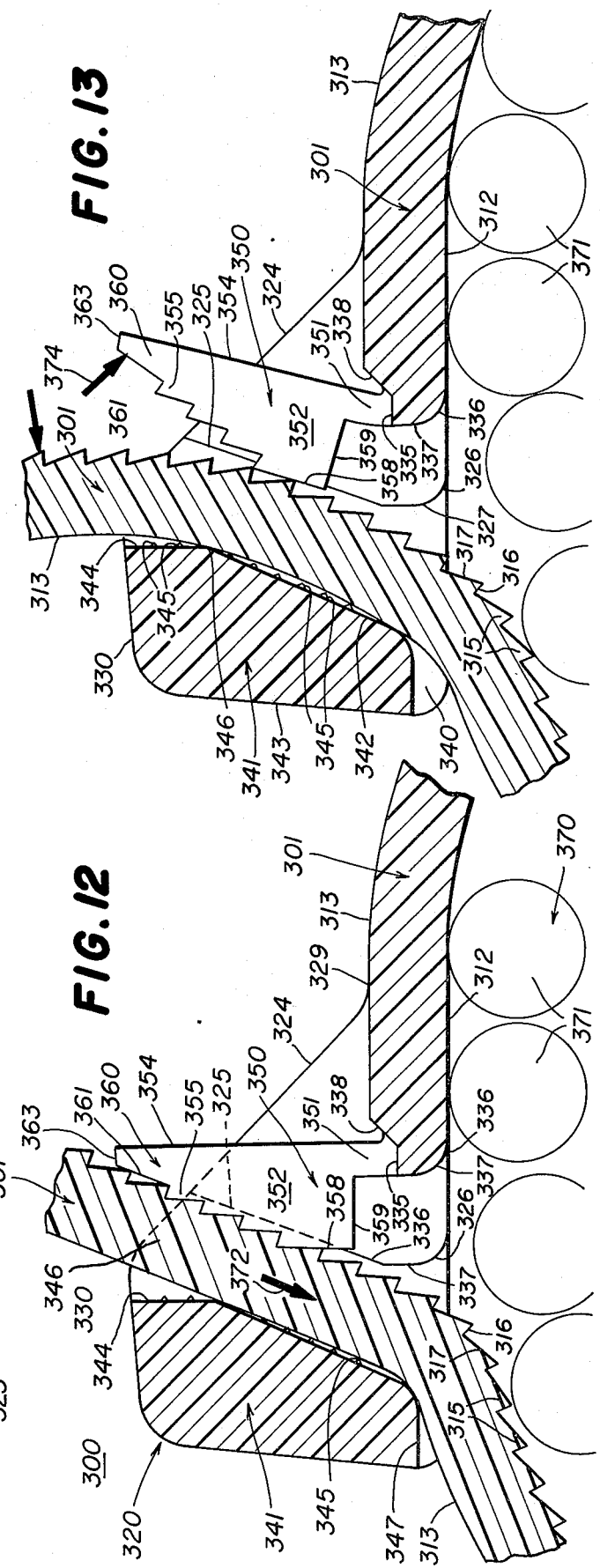

RELEASABLE ONE-PIECE CABLE TIE

This invention is directed to a cable tie and, more particularly, to a releasable integral one-piece cable tie to be tensioned about a bundle of wires and the like.

An object of this invention is to provide a releasable integral one-piece cable tie to be tensioned about a bundle of wires and the like, the cable tie comprising an elongated flexible strap, a row of teeth disposed on one longitudinal surface of the strap and arranged transversely with respect thereto, a frame integral with one end of the strap and including an abutment wall, the frame having an entry surface and an exit surface and a strap receiving opening extending therethrough, a pawl disposed within the frame in the strap-receiving opening and hingedly connected thereto the abutment wall having a strap-bearing surface disposed toward the pawl and defining therewith a strap-receiving throat, a set of teeth on the pawl arranged transversely with respect thereto and disposed toward the abutment wall and shaped to engage the row of teeth on the strap, the strap being deformable into a loop encircling a bundle of wires with the free end of the strap extending into the strap-receiving throat and through the opening in the frame and therebeyond, the set of teeth being disposed toward the row of teeth and engageable with successive ones thereof as the strap is tensioned about the bundle of wires on a tensioned condition, thus to lock the strap in its tensioned condition about the bundle of wires, and an extension on the pawl extending beyond the exit surface in all positions of the pawl for engagement by a user to move the pawl from the tensioned condition thereof to a release condition, the set of teeth in the release condition of the pawl being out of engagement with the row of teeth, thereby to allow withdrawal of the strap from the frame.

Another object of the invention is to provide a releasable one-piece cable tie of the type set forth, wherein the extension on the pawl has a taper toward the outer end thereof.

Another object of the invention is to provide a releasable one-piece cable tie of the type set forth wherein the frame is integral with one end of the strap and includes an abutment wall and an end wall and wherein a ledge extends longitudinally from the end wall toward the abutment wall.

Another object of the invention is to provide a releasable cable tie of the type set forth, wherein the topmost tooth of the set of teeth is spaced below the exit surface.

Another object of the invention is to provide a releasable one-piece cable tie of the type set forth, wherein the frame is integral with one end of the strap and has an entry surface and an exit surface and includes a pair of longitudinally extending and spaced-apart side walls on the one end of the strap and an abutment wall joining the outer ends of the side walls.

A further object of the invention is to provide a releasable cable tie of the type set forth wherein, in the release condition of the strap, the topmost tooth of the set of teeth is spaced beyond the side walls toward the exit surface.

Further features of the invention pertain to the particular arrangement of the parts of the cable tie, whereby the above-outlined and additional operating features thereof are attained.

The invention, both as to its organization and method of operation, together with further objects and advantages thereof, will best be understood by reference to the following specification taken in connection with the accompanying drawings, in which:

FIG. 1 is a plan view with certain of the parts broken away of a releasable integral one-piece cable tie made in accordance with and embodying the principles of the present invention;

FIG. 2 is a side elevational view with certain parts broken away of the cable tie of FIG. 1;

FIG. 3 is a plan view with certain parts broken away of the reverse side of the cable tie of FIGS. 1 and 2;

FIG. 4 is a view illustrating the cable tie of FIGS. 1 to 3 applied about a bundle of wires;

FIG. 5 is an enlarged fragmentary plan view of the frame forming a part of the cable tie of FIGS. 1–3;

FIG. 6 is a view in vertical section along the lines 6—6 of FIG. 5;

FIG. 10 is an enlarged fragmentary plan view of the frame forming a part of a second form of releasable cable tie made in accordance with the present invention;

FIG. 11 is a view in vertical section along the line 11—11 of FIG. 10; and

FIGS. 12 and 13 are digrammatic views illustrating the application of the cable tie of FIGS. 10 and 11 about a bundle of wires.

Figure 7:
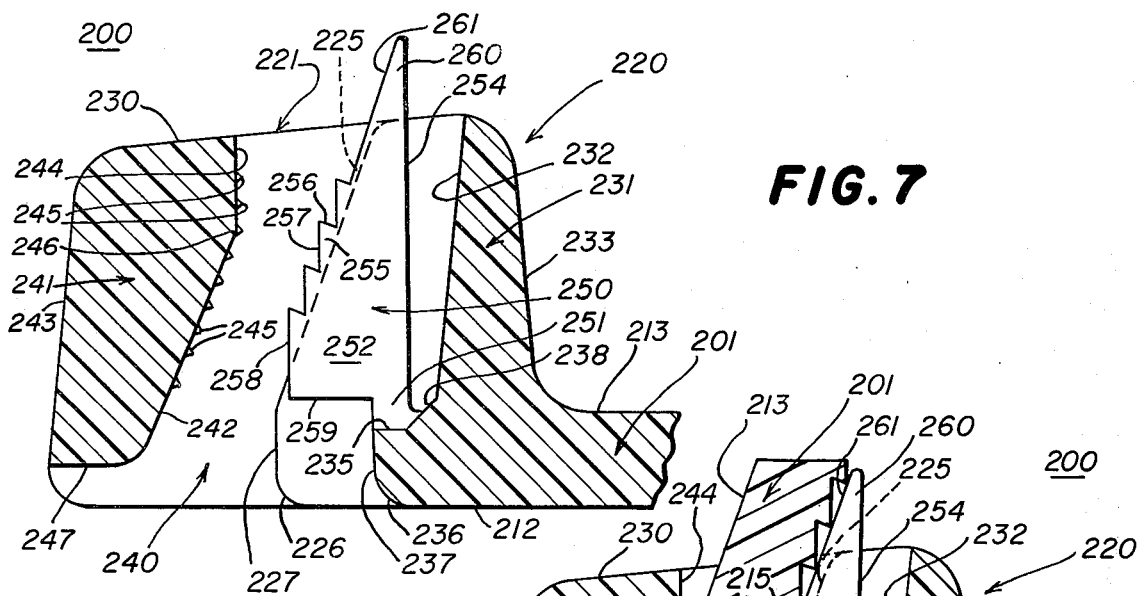
FIG. 7 is a further enlarged fragmentary view in vertical section along the line 7—7 of FIG. 5.

Referring to FIGS. 1 to 3 of the drawings, there is shown a first preferred embodiment of an integral one-piece cable tie made in accordance with and embodying the principles of the present invention. The cable tie 200 includes generally a strap 201 carrying on one end thereof a frame or head 220 having a strap-receiving opening or throat 240 therethrough in which is disposed a pawl 250. The cable tie 200 is typically used to bind a bundle 270 formed of a plurality of wires 271, and accordingly, the cable tie 200 has been illustrated in this end use in FIG. 4. However, it will be appreciated that the cable tie 200 can be advantageously used to bind other objects in a like manner.

A preferred material of construction of the cable tie 200 is a suitable synthetic organic plastic resin, the preferred resin being one of the polyamide resins; the resin must be sufficiently flexible to accommodate the deformation of the several parts of the cable tie 200 as illustrated throughout the drawings. It is an important object of the invention that each of the parts of the cable tie 200 is integral with the adjacent parts thereof, whereby the cable tie 200 is truly one-piece and formed integral throughout.

The strap 201 is elongated and flexible and includes an outer end 202 which extends downwardly as viewed in FIG. 2 with respect to the remaining portion of the strap 201 as molded, the outer end 202 carrying thereon a tip 203 provided with tapered sides 204. The outer end 202 further has an inner or bundle engaging surface 206 an outer surface 207, the inner surface 206 carrying a plurality of transversely spaced-apart pairs of gripping projections 208 equidistantly spaced along the length of the outer end 202. A high ridge or detent 209 is provided on the outer surface 207 and is arranged transversely with respect thereto and adjacent to the juncture 211 between the outer end 202 and the remaining portion of the strap 201. In use, the detent 209 is caused to engage the strap 201 on the frame 220 temporarily in an encircling position with respect to an associated bundle 270, all as will be explained more fully hereinafter.

The strap 201 further includes a pair of longitudinally extending strap sides 210 which extend the length of the strap 201, and there is provided on the portion of the strap 201 disposed between the juncture 211 with the outer end 202 and the juncture with the frame 220 an inner or bundle-engaging surface 212 and an outer surface 213. Disposed in the surface 212 is a row of abutments teeth 215, the teeth 215 being disposed in a recessed position with respect to the surface 212 and extending laterally of the strap 201 and having a length slightly less than the width of the surface 212, whereby to be confined completely within the body of the strap 201. As illustrated, each of the teeth 215 has a shorter side 216 disposed substantially normal to the adjacent strap surface 212 and a longer or inclined side 217.

The frame 220 is integral with the strap 201 and comprises a pair of side walls or members 221, a rear wall or member 231 and a front wall or member 241. As may be best seen in FIG. 6, the side walls 221 are laterally spaced apart and include inner surfaces 222 that extend the full height of the frame 220 and are disposed essentially parallel to one another, the inner surfaces 222 more specifically extending from the inner surface 212 which serves as an entry surface for the frame 220 to an exit surface 230 on the top of the frame 220 as viewed in FIG. 6. The inner surfaces 222 further are spaced apart a distance greater than the distance between the strap sides 210, whereby the strap 201 may be received between the inner surfaces 222, all as will be explained more fully hereinafter. Each of the side walls 220 further includes an outer surface 223 that extends from the entry surface 212 to the exit surface 230.

Provided on each of the side walls 221 is a rail generally designated by the numeral 225, the rails 225 extending laterally inwardly toward one another and having disposed toward the front wall 241 a surface 227 extending substantially normal to the entry surface 212 and joined thereto by a curved portion 226, the upper edge of surface 227 being interconnected with an inclined surface 229, the inclined surfaces 229 being disposed essentially normal to the inner surfaces 222 of the side walls 221 and having inner surfaces 228 facing one another and disposed essentially parallel to the inner surfaces 222. The rails 225 serve to guide the strap 201 along a predetermined path through the frame 220, all as will be explained more fully hereinafter.

The rear wall or end wall 231 includes an inner surface 232 and an outer surface 233, the inner surface 232 diverging downwardly away from the outer surface 233 from the exit surface 230 to the entry surface 212, whereby the rear wall 231 is thicker at the bottom thereof than at the top thereof, all as is illustrated in FIG. 7. It further is pointed out that the strap 201 is joined to the frame 220 at the lower and thicker portion of the end wall 231.

Figure 8:
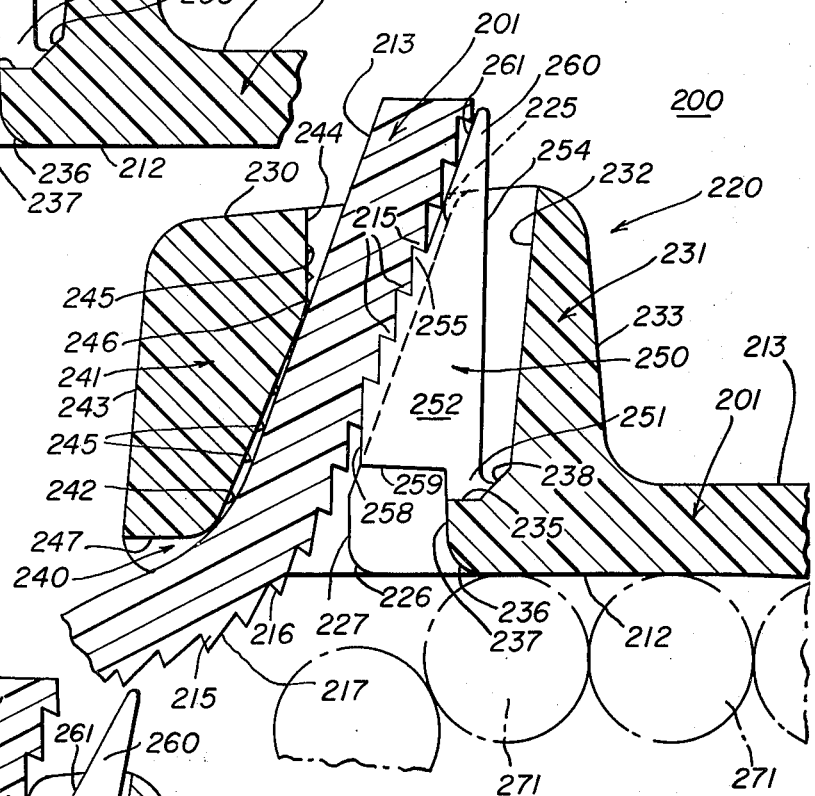
FIGS. 8 and 9 are diagrammatic views illustrating the application of the cable tie of FIGS. 1 to 3 about a bundle of wires.

The front wall or abutment wall 241 has an inner surface which includes a lower inclined surface 242, an upper relieved surface 244, both of which surfaces are spaced from the rear wall 231 in the direction opposite to the strap 201. The inner surface 242 is inclined at an angle of about 66° from the entry surface 212 toward the exit surface 230 with respect to the longitudinal axis of the strap 201 as molded, the abutment wall 241 and the pawl 250 cooperating to provide therebetween a strap-receiving opening 240 that has the longitudinal axis thereof generally parallel to the strapbearing surface 242. The relieved surface 244 is disposed essentially normal to the longitudinal axis of the strap 201 as molded and is spaced from the pawl 250 in the direction away from the strap 201 and is shaped to facilitate molding of the cable tie 200. More specifically, the surface 244 is in the form of a plane disposed substantially normal to the longitudinal axis of the strap 201 as molded, but may be inclined upwardly and away from the strap 201, whereby the surface 244 is relieved at least to a plane substantially normal to the longitudinal axis of the strap 201 as molded and spaced from the pawl 250. The front wall 241 also has an outer surface 243 which extends downwardly from the exit surface 230 and terminates a short distance away from the entry surface 212 and joins thereat a guide surface 247 which connects the inner surface 242 and the outer surface 243. More specifically, the guide surface 247 is spaced away from the entry surface 212 and together with the inner surfaces 222 of the side walls 221 defines a strap-receiving channel in the frame 220. The channel thus provided in the frame 220 and beneath the front wall 241 permits the frame 220 to lie more closely against the associated bundle 270 when the parts are in the tensioned condition as illustrated in FIGS. 4 and 8. In passing, it is noted that the exit surface 230 is inclined with respect to the entry surface 212 and the longitudinal axis of the strap 201 as molded, and more specifically slopes downwardly toward the entry surface 212 in a direction away from the strap 201.

There is provided on the strap-bearing surface 242 and the upper relieved surface 244 a plurality of transversely arranged and longitudinally spaced-apart strap-gripping projections 245. The projections 245 have a length slightly less than the width of the strap 201 and are urged into the adjacent surface 213 of the strap 201 in the tightening of the cable tie 200 about the associated bundle 270.

Extending between the rails 225 adjacent to the lower portion of the end wall 231 is a ledge 235, the ledge 235 being essentially rectangular and directed toward the front wall 241 and disposed substantially parallel to the entry surface 212 and the longitudinal axis of the strap 201 as molded. The transverse edge of the ledge 235 disposed toward the strap 201 joins an upwardly inclined surface 238 that connects with the inner surface 232 on the rear wall 231. A curved bottom surface 236 interconnects the entry surface 212 and an upwardly extending surface 237, the surface 237 connecting with the edge of the ledge 235 disposed toward the front wall 241, the side edges of the ledge 235 and the surface 238 being connected with the respective inner surfaces 228 of the rails 225.

Mounted within the strap-receiving opening 240 in the frame 220 is a pawl 250, the pawl 250 being connected to and mounted on the ledge 235 by means of a hinge 251, the hinge 251 being essentially rectangular in cross section. The pawl 250 has a pair of side surfaces 252 disposed substantially parallel to each other (see FIGS. 5 and 6), the side surfaces 252 being spaced apart a distance slightly less than the transverse dimensions of the teeth 215 on the strap 201. The pawl 250 also has a rear surface 254 disposed toward the inner surface 232. Integral with the pawl 250 is an extension 260 extending beyond the exit surface 230, the extension 260 having an inclined surface 261 spaced from and disposed away from the abutment wall 241 and having side surfaces 262 which are continuous with the side surfaces 252 of the pawl 250. The extension 260 is thereby provided with a taper towards the outer end thereof. The extension 260 extends beyond the exit surface in all positions of the pawl. A set of teeth 255 is provided on the surface of the pawl 250 disposed toward the front wall 241, the teeth 255 each having a shorter side 256 and a longer inclined side 257. As illustrated in FIG. 7, the topmost 255 of the set of teeth 255 is spaced belwo the exit surface 230. The crests of the teeth 255 all lie in a common plane which is essentially parallel to the opposed inner surface 242 on the front wall 241 as molded; and the roots of the teeth 255 on the pawl 250 also lie in a common plane that is essentially parallel to the opposed inner surface 242 on the front wall 241 as molded. Furthermore, the crest-to-crest distance on the pawl teeth 255 is slightly less than the crest-to-crest distance on the strap teeth 215, whereby to insure that all of the teeth 255 on the pawl 250 engage teeth 215 on the strap 201, all as will be explained more fully hereinafter. The pawl 250 further has a lower surface 258 that extends downwardly and is disposed substantially normal to the entry surface 212 and joins a bottom surface 259 disposed toward the hinge 251 and substantially normal to the surface 258 whereby to define the portion of the pawl 250 disposed forwardly of the hinge 251.

In use, the cable tie 200 is encircled about a bundle 270 of wires 271 as illustrated in FIG. 4. Prior to such encirclement of the bundle 270, the frame 220 and the several parts associated therewith including the pawl 250 are in the positions shown in FIG. 7, i.e., in the as-molded condition thereof. It will be noted that the crests of the teeth 255 lie in a plane that is essentially parallel to the inner surface 242 of the front wall 241 while the surface 244 is relieved forwardly from the plane defined by the surface 242, several of the teeth 255 however, being disposed opposite the inclined surface 242 and the projections 245 thereon.

The first step in applying the cable tie 200 about the bundle 270 is to insert the outer end 202 into the frame 220. If desired, the detent 209 may be caused to engage the transversely extending ridge 246 at the juncture between the surfaces 242 and 244 temporarily to hold the strap 201 about a group of wires 271. In this manner, the workman can continue to add wires 271 to the bundle 270 or remove wires 271 therefrom, if required, all before locking engagement of the strap teeth 215 with the pawl teeth 255.

Thereafter, the user grasps the strap end 202 utilizing the projections 208 and pulls the strap 201 further through the frame 220. The rows of projections 208 are spaced apart a distance greater than the width of the teeth 255 so that the projections 208 will not engage the teeth 255 during the insertion of the strap 201 into the frame 220. Initial engagement between the strap 201 and the pawl 250 is with the lowermost one of the teeth 255, i.e., the tooth 255 disposed toward the entry surface 212, such engagement pivoting the pawl 250 in the clockwise direction. During further tightening movement of the strap 201, the teeth 215 and the strap 201 successively engage the lowermost one of the teeth 255 on the pawl 250, thereby to hold the pawl 250 generally in the position illustrated during tightening movement of the strap 201 through the frame 220. Preferably a tool such as that illustrated in the Caveney and Moody U.S. Pat. No. 3,169,560, granted Feb. 16, 1965, or that illustrated in the Caveney and Moody U.S. Pat. No. 3,254,680, granted June 8, 1966, is utilized to tighten the strap 201 about the bundle 270, which tool automatically at the end of the tightening operation severs the strap 201 at a point disposed beyond the exit surface 230 of the frame 220 and disposed slightly beyond the outermost end of the extension 260 of the pawl 250, such as is illustrated in FIG. 8.

Immediately after severing of the strap 201, the tension in the portion of the strap 201 about the bundle 270 tends to withdraw the strap 201 from the frame 220 in a retrograde or strap-withdrawal or strap-loosening direction. During such movement of the strap 201 relative to the frame 220, the tooth 215 disposed toward the lowermost tooth 255 engages the lowermost tooth 255 and begins to pivot the pawl 250 in a counterclockwise direction to the position illustrated in FIG. 8. As the retrograde movement of the strap 201 continues, the teeth 255 above the lowermost tooth 255 progressively engage the teeth 215 of the strap 201, until all of the teeth 255 on the pawl 250 engage the adjacent ones of the teeth 215 on the strap 201. During this movement of the strap 201 in conjunction with the pawl 250, the projections 245 on the surface 242 are pressed against the adjacent surface 213 of the strap 201 firmly to grip the same. The parts finally arrive in the position illustrated in FIG. 8, the position of the pawl 250 in FIG. 8 which illustrates the tensioned condition of the parts being essentially the same as that in the as-molded position illustrated in FIG. 7. With the parts in the positions illustrated in FIG. 8, the strap 201 is firmly gripped between the abutment wall 241 and the pawl 250, and specifically, the projections 245 on the strap-bearing surface 242 are in firm engagement with the surface 213 of the strap 201 while certain of the teeth 215 on the strap 201 are in firm locking engagement with the teeth 255 on the pawl 250. The inclined surface 261 is disposed against the crests of the strap teeth 215, this portion of the pawl 250 and specifically this portion of the extension 260 serving as an anti-rotation member to limit the amount of rotation of the pawl 250 in a counter-clockwise direction as viewed in FIG. 8.

Figure 9:
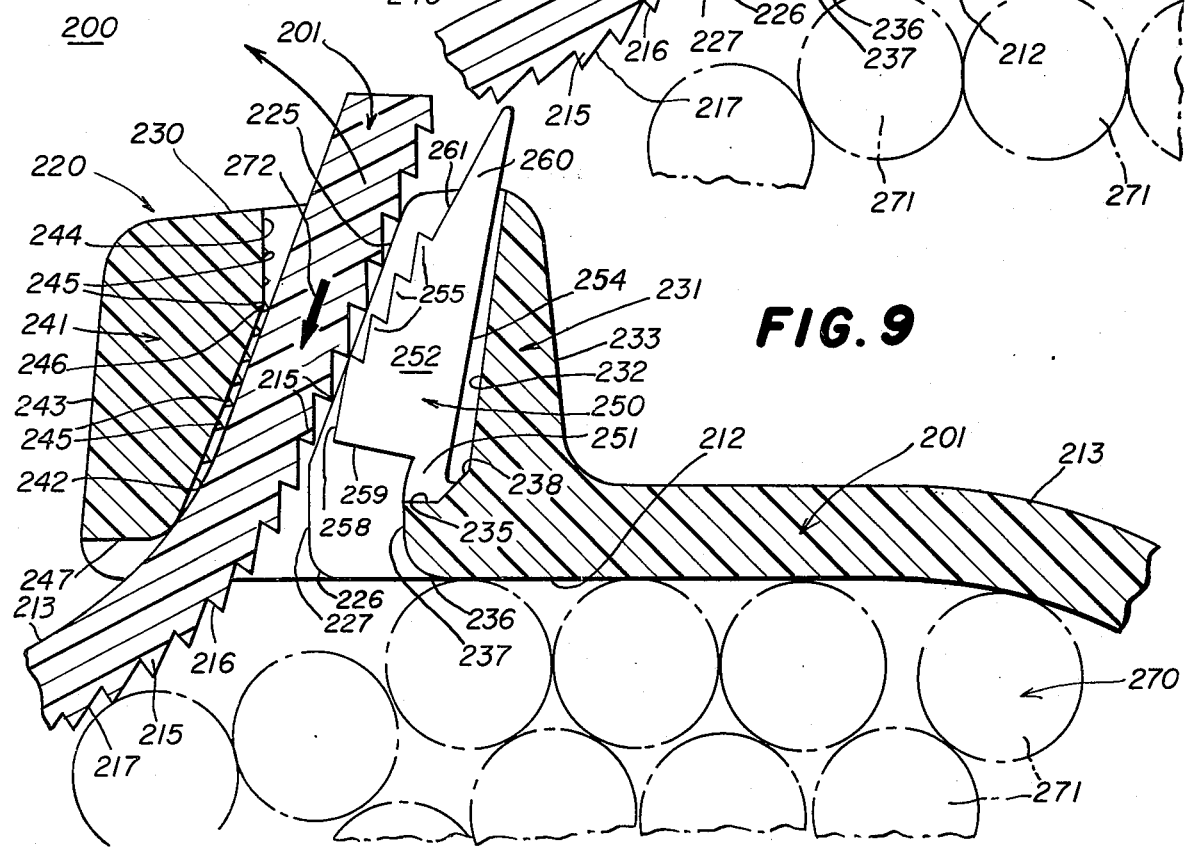

The strap 201 may be released from the tensioned position to a release position as illustrated in FIG. 9. The extension 260 of the pawl 250 extending beyond the exit surface 230 may be engaged by a user and moved from the tensioned position in a direction towards the inner surface 232 of the wall 231, whereby the set of teeth 255 are positioned out of engagement with the row of teeth 215 on the strap 201. In this release position the strap 201 is allowed to be withdrawn from the frame 220 by the withdrawal tension in the direction of the arrow 272, thereby to loosen the strap 201 until the desired circumference of the loop is achieved or until the withdrawal tension is decreased to a negligible magnitude. After the extension 210 of the pawl 250 has been moved so as to disengage the set of teeth 255 from the row of teeth 215 and the desired length of strap has been released to form the desired circumference of the loop around the bundle of wires 270, the pawl may once again be moved to the tensioned position whereby the teeth 215 on the strap 201 are positioned in a firm locking engagement with the teeth 255 on the pawl 250.

It is noted that in the described operation of this embodiment of the pawl 250, during the insertion of the strap 201 into the frame 220, during the tensioning of the strap 201 about the bundle 270, and during the retrograde movement of the strap 201 to the final locked or tensioned position of FIG. 8, the pawl 250 is not limited only to pivotal movement via the hinge 251 with respect to the frame 220 and about the connection to the ledge 235 but exhibits a longitudinal movement as well. It further is pointed out that the extension 260 of the pawl 250 extends beyond the exit surface 230 in all positions of the pawl 250 thereof including the as-molded position of FIG. 7 and the tensioned position of FIG. 8 and the release position of FIG. 9.

The channel in the front wall 241 provided by the surface 247 thereon and the inner surfaces 222 on the side walls 221 assists in the entry of the tip 203 into the throat 240 and also assists in permitting the frame 220 to lie more nearly flat against the associated bundle 270.

Once the parts are in the tensioned condition of FIG. 8, any force tending to withdraw the strap 201 from within the throat 240 in a strap-loosening direction serves to move the teeth 255 on the pawl 250 into more firm engagement with the engaged ones of the teeth 215 on the strap 201, and serves to move the projections 245 into more firm engagement with the surface 213 on the strap 201, thereby firmly to grip the strap 201 between the front wall 241 and the pawl 250. This described action prevents inadvertent withdrawal of the strap 201 from the frame 220, thus to lock the strap 201 in its tensioned condition about the bundle of wires.

Referring again to FIG. 7 of the drawings, it will be appreciated that the crests of the teeth 255 lie in a common surface, i.e., a plane, which common surface is disposed substantially equidistantly from the strap-bearing surface 242 along the length thereof both in the as-molded condition of the parts, and also in the tensioned condition of the parts. It further is pointed out that the exit surface 230 extends beyond the teeth 255. All of the teeth 255 in the tensioned condition are engaged and loaded.

The surface 244 is relieved at least to a plane substantially normal to the longitudinal axis of the strap 201 as molded and is spaced from the pawl 250 toward the front wall 241. By relieving the surface 244 in this manner, it is possible to mold the teeth 255 on the pawl 250 provided that the teeth 255 and the other portions of the pawl 250 are properly shaped. More specifically, the planes defined by the surfaces of the teeth 255 disposed toward the entry surface 212, i.e., the surfaces 257, converge with the planes defined by the surfaces of the pawl 250 disposed toward the exit surface 230, i.e., the surface 254. The two sets of planes named converge at points disposed on the exit side of the frame 229, convergence being at angles as small as zero degrees, i.e., the sets of planes may be essentially parallel. This convergence of the several surfaces permits the pawl 250 and the teeth 255 thereon to be properly molded as one piece with the remaining portion of the cable tie 200.

Referring to FIG. 8, it will be noted that the rear surface 254 of the extension 260 is spaced from the surface 232 so that, when the pawl 250 is in the release position, the rear surface 254 of the pawl 250 does not engage the inner surface 232 of the end wall 231, thereby to permit unrestricted flexure of the pawl 250 during the insertion or withdrawal of the strap 201 into or from the frame 220. This feature is important to prevent damage to the teeth 255 on the pawl 250 and to prevent tearing of the pawl 250 from the frame 220 during the insertion or withdrawal of the strap 201.

In a constructional example of the cable tie 200 for use with bundles having a diameter of 1.75 inches, the overall length thereof is 7.5 inches, the width of the strap 201 is 0.180 inch, the thickness of the strap 201 is 0.040 inch, the length of the outer end 202 is 1.225 inches, the portion of the strap 201 carrying the teeth 215 has a length of 5.675 inches, the depth of the teeth 215 is .010 inch and the pitch thereof is 0.025 inch, the inclination of the surfaces 217 to the surface 212 being 22°; the dimension of the frame 220 in the direction of the strap 201 is 0.195 inch, the overall height of the frame 220 is 0.130 inch, the overall width of the frame 220 is 0.230 inch, the inclination of the surfaces 223, 233 and 242 is 5° and the inclination of the surface 232 is 3°; the surface 229 is inclined at an angle of 70° with respect to the longitudinal surface of the strap 201 as molded, the surface 242 is inclined at an angle of 66° with respect to the longitudinal axis of the strap as molded, while the surface 244 is substantially normal thereto; the uppermost tooth 255 is disposed 0.027 inch below the uppermost portion of the surface 230, the distance between the surfaces 212 and 247 is 0.010 inch, the height of the projections 245 is 0.002 inch and the length thereof is 0.075 inch, the distance between the surfaces 222 is 0.195 inch and the distance between the surfaces 228 is 0.120 inch.

There is illustrated in FIGS. 10 through 13 of the drawings a second embodiment of a releasable integral one-piece cable tie made in accordance with the present invention, the cable tie being generally designated by the numeral 300. Many of the parts of the cable tie 300 are identical in construction to like parts in the cable tie 200 described above, and accordingly, there has been applied to each part of the cable tie 300 a reference numeral in the 300 series corresponding to the reference numeral in the 200 series that was applied to the like part of the cable tie 200 described above.

The fundamental differences between the cable tie 300 of FIGS. 10 to 13 and the cable tie 200 described above is in the construction of the side walls 321 and the construction of the extension 360 of the pawl 350. Furthermore, the end wall 231 of the frame 220 has been eliminated. It will be noted that there is provided on the extension 360 of the pawl 350 an inclined front surface 361 interconnecting the topmost tooth 355 of the set of teeth 355 and the top surface 363, the top surface 363 being planar and disposed substantially normal to the rear surface 354 of the pawl 350. The pair of side walls 321 or members interconnect the exit surface 330 with the outer surface 313 of the strap 301, the top surface 324 of the side wall 321 being flat and declined rearwardly toward the outer surface 313 of the strap 301, the surfaces 324 and the surface 313 forming a juncture 329. The rails 325 terminate at the top surface 324 of the declined side walls 321 as illustrated in FIG. 11. In addition, in the release condition of the strap 301 as illustrated in FIG. 13, the topmost tooth 325 of the set of teeth 355 is spaced beyond the side walls 321 towards the exit surface 330. As the pawl 350 is moved out of engagment with the strap 301 and to the release position by a force in a direction illustrated by the arrows 374, the set of teeth 355 are moved out of engagement with the row of teeth 315 to allow withdrawal of the strap 301 from the frame 320. When the pawl 350 is in the release position there is no limit to the extent it can be pivoted in a clockwise direction, there being no end wall which may restrict the pawl 350. The extension 360 of the pawl 350 as shown in this embodiment may extend only a slight distance above the exit surface 330, there being no end wall to hinder a user from gripping the extension 360 and forcing the set of teeth 355 out of engagement with the row of teeth 315. With the parts in the position of FIG. 12, the inclined surface 361 is disposed against the crests of the strap teeth 315, this portion of the pawl 350 and specifically this portion of the extension 360 serving as an anti-rotation member to limit the amount of rotation of the pawl 350 in a counterclockwise direction as viewed in FIG. 12.

From the above, it will be seen that there have been provided improved cable ties which fulfill all of the objects and advantages set forth above.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A releasable integral one-piece cable tie to be tensioned about a bundle of wires and the like, said cable tie comprising an elongated flexible strap, a row of teeth disposed on one longitudinal surface of said strap and arranged transversely with respect thereto, a frame integral with one end of said strap and including an abutment wall and an end wall, said frame having an entry surface and an exit surface and a strap-receiving opening extending therethrough, a rigid ledge on said end wall extending longitudinally therefrom toward said abutment wall, a pawl disposed within said frame in said strapreceiving opening and hingedly mounted on said ledge, the longitudinal extent of said pawl at its juncture with said ledge being less than the longitudinal extent of said ledge, said abutment wall having a strap-bearing surface disposed toward said pawl and defining therewith a strap-receiving throat, at set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said row of teeth as said strap is tensioned about the bundle of wires to a tensioned condition and release of said strap causing at least certain ones of said row of teeth firmly to engage said set of teeth, a plurality of the teeth in said set of teeth being positioned opposite said strap-bearing surface in the tensioned position of said strap with said strap-bearing surface extending beyond said plurality of teeth toward both said entry surface and said exit surface thereby to encompass said plurality of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagement by a user to move said pawl from the tensioned condition thereof to a release condition, said set of teeth in the release condition of said pawl being out of engagement with said row of teeth, thereby to allow withdrawal of said strap from said frame.

2. The releasable integral one-piece cable tie set forth in claim 1, wherein said end wall is relatively thicker adjacent to said entry surface and relatively thinner adjacent to said exit surface in the direction disposed longitudinally of said strap, said ledge being disposed on said end wall at the thicker portion thereof.

3. The releasable cable tie set forth in claim 1, wherein the topmost tooth of said set of teeth is spaced below said exit surface.

4. A releasable integral one-piece cable tie to be tensioned about a bundle of wires and the like, said cable tie comprising an elongated flexible strap, a row of abutments disposed on one longitudinal surface of said strap and arranged transversely with respect thereto, a frame integral with one end of said strap and including an abutment wall, said frame having an entry surface and an exit surface and a strap receiving opening extending therethrough, said exit surface sloping toward said entry surface in a direction away from said strap, a pawl disposed within said frame in said strap-receiving opening and hingedly connected thereto, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, said strap being deformable into a loop encircling a bundle of wires with the free end of said strap extending into said strap-receiving throat and through the opening in said frame and therebeyond, said tooth being disposed toward said row of abutments as said strap is tensioned about the bundle of wires to a tensioned condition and release of said strap causing at least one of said abutments firmly to engage said tooth, any force tending to withdraw said strap from within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagement by a user to move said pawl from the tensioned condition thereof to a release condition, said tooth in the release condition of said pawl being out of engagement with said row of abutments, thereby to allow withdrawal of said strap from said frame.

5. A releasable integral one-piece cable tie to be tensioned about a bundle of wires and the like, said cable tie comprising an elongated flexible strap, a row of abutments disposed on one longitudinal surface of said strap and arranged transversely with respect thereto, a frame integral with one end of said strap and including an abutment wall, said frame having an entry surface and an exit surface and a strap receiving opening extending therethrough, a pawl disposed within said frame in said strap-receiving opening and hingedly connected thereto, said abutment wall having a strap-bearing surface disposed toward said pawl and defining therewith a strap-receiving throat and an upper recessed surface disposed above said strap-bearing surface adjacent to said exit surface, said upper recessed surface being relieved at least to a plane substantially normal to the longitudinal axis of said strap, a tooth on said pawl arranged transversely with respect thereto and disposed toward said abutment wall and shaped to engage said row of abutments on said strap, said strap being deformable into a loop encircling a bundle of wires with the free end of said strap extending into said strap-receiving throat and through the opening in said frame and therebeyond, said tooth being disposed toward said row of abutments as said strap is tensioned about the bundle of wires to a tensioned condition and release of said strap causing at least one of said abutments firmly to engage said tooth, any force tending to withdraw said strap form within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagment by a user to move said pawl from the tensioned condition thereof to a release condition, said tooth in the release condition of said pawl being out of engagement with said row of abutments, thereby to allow withdrawal of said strap from said frame.

6. A releasable integral one-piece cable tie to be tensioned about a bundle of wires and the like, said cable tie comprising an elongated flexible strap, a row of teeth disposed on one longitudinal surface of said strap and arranged transversely with respect thereto, a frame integral with one end of said strap and including an abutment wall, said frame having an entry surface and an exit surface and a strap-receiving opening extending therethrough, a pawl disposed within said frame in said strap-receiving opening and hingedly connected thereto, said abutment wall having a strap-bearing surface disposed toward said pawl and defining therewith a strap-receiving throat, a set of teeth on said pawl arranged transversely with respect thereto and disposed toward said abutment wall and shaped to engage said row of teeth on said strap, said strap being deformable into a loop encircling a bundle of wires with the free end of said strap extending into said strap-receiving throat and through the opening in said frame and therebeyond, said set of teeth being disposed toward said row of teeth as said strap is tensioned about the bundle of wires to a tensioned condition and release of said strap causing at least certain ones of said row of teeth firmly to engage said set of teeth, the crest-to-crest distance of said set of teeth being slightly less than the crest-to-crest distance of said row of teeth so that when the tooth in said set of teeth disposed toward said entry surface is the first to engage one of said row of teeth all of the teeth in said set of teeth will ultimately engage teeth in said row of teeth, any force tending to withdraw said strap from within said strap-receiving throat in a strap-loosening direction serving to move said set of teeth into more firm engagement with the engaged ones of said row of teeth firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagement by a user to move said pawl from the tensioned condition thereof to a release condition, said set of teeth in the release condition of said pawl being out of engagement with said row of teeth, thereby to allow withdrawal of said strap from said frame.

7. The releasable cable tie set forth in claim 6, wherein the planes defined by the surfaces of said set of teeth disposed toward said entry surface in the tensioned condition converge with the planes defined by the surfaces of said pawl disposed toward said exit surface and away from said abutment wall in the tensioned condition at points disposed on the exit side of said frame at angles as small as zero degrees.

8. The releasable cable tie set forth in claim 6, wherein in the tensioned condition of said strap the crests of a plurality of the teeth in said set of teeth are positioned opposite said strap-bearing surface and lie in a common surface that is disposed substantially equidistant from said strap-bearing surface, and said strap-bearing surface extends beyond said plurality of teeth.

9. The releasable cable tie set forth in claim 6, wherein in the tensioned condition of said strap the crests of a plurality of the teeth in said set of teeth are positioned opposite said strap-bearing surface and lie in a plane substantially parallel to the plane of said strap-bearing surface, and said strap-bearing surface extends beyond said plurality of teeth.

10. An integral one-piece cable tie to be tensioned about a bundle of wires and the like, said cable tie comprising an elongated flexible strap, a row of abutments disposed on one longitudinal surface of said strap an arranged transversely with respect thereto, a frame integral with one end of said strap and including an abutment wall, said frame having an entry surface and an exit surface and a strap-receiving opening extending therethrough, a pawl disposed within said frame in said strap-receiving opening and hingedly connected thereto, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, and an anti-rotation member on said pawl extending toward said exit surface and spaced from said frame in the as-molded position of said pawl and abutting against the adjacent portion of said strap in the strap-locking position of said pawl, said strap being deformable into a loop encircling a bundle of wires with the free end of said strap extending into said strap-receiving throat and through the opening in said frame and therebeyond, said row of abutments being disposed toward said tooth as said strap is tensioned about the bundle of wires to a tensioned condition and release of said strap causing at least one of said abutments firmly to engage said tooth and to shift said pawl to the strap-locking position thereof, said tooth in the final tensioned condition being disposed opposite the strap-bearing surface only and wedging the engaged portion of said strap against said strap-bearing surface only, any force tending to withdraw said strap from within said strap-receiving throat in a strap-withdrawal direction serving to move the associated one of said abutments into more firm engagement with said tooth firmly to grip said strap between said strap-bearing surface and said pawl, whereby to prevent inadvertent withdrawal of said strap from said frame and thus to lock said strap in its tensioned condition about the bundle of wires.

11. A releasable integral one-piece cable tie to be tensioned about a bundle of wires and the like, said cable tie comprising an elongated flexible strap, a row of abutments disposed on one longitudinal surface of said strap and arranged transversely with respect thereto, a frame integral with one end of said strap and including an abutment wall, said frame having an entry surface and an exit surface and a strap receiving opening extending therethrough, a pawl disposed within said frame in said strap-receiving opening and being of a generally triangular configuration and hingedly joined at the base thereof to said frame, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, said strap being deformable into a loop encircling a bundle of wires with the free end of said strap extending into said strap-receiving throat and through the opening in said frame and therebeyond, said tooth being disposed toward said row of abutments as said strap is tensioned about the bundle of wires to a tensioned condition and release of said strap causing at least one of said abutments firmly to engage said tooth, any force tending to withdraw said strap from within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawal of said strap from said frame and thus to lock said strap in its tensioned condition about the bundle of wires, the tapered free end of said triangular pawl extending beyond said exit surface to provide a finger engageable portion to facilitate release of said pawl from said strap, thereby to allow withdrawal of said strap from said frame.

12. A releasable cable tie to be tensioned about a bundle of wires and the like, said cable tie comprising an elongated flexible strap, a row of abutments disposed on one longitudinal surface of said strap and arranged transversely with respect thereto, a frame on one end of said strap and including an abutment wall, said frame having an entry surface and an exit surface and an opening extending therethrough for receiving the other end of said strap, said exit surface sloping toward said entry surface in a direction away from said strap, a pawl disposed within said frame in said strap-receiving opening and hingedly connected thereto, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, said strap being deformable into a loop encircling a bundle of wires with the free end of said strap extending into said strap-receiving throat and through the opening in said frame and therebeyond, said tooth being disposed toward said row of abutments as said strap is tensioned about the bundle of wires to a tensioned condition and release of said strap causing at least one of said abutments firmly to engage said tooth, any force tending to withdraw said strap from within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagement by a user to move said pawl from the tensioned condition thereof to a release condition, said tooth in the release condition of said pawl being out of engagement with said row of abutments, thereby to allow withdrawal of said strap from said frame.

13. A cable tie to be tensioned about a bundle of wires and the like, said cable tie comprising an elongated flexible strap, a row of abutments disposed on one longitudinal surface of said strap and arranged transversely with respect thereto, a frame on one end of said strap and including an abutment wall, said frame having an entry surface and an exit surface and an opening extending therethrough for receiving the other end of said strap, a pawl disposed within said frame in said strap-receiving opening and hingedly connected thereto, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, and an anti-rotation member on said pawl extending toward said exit surface and spaced from said frame in the as-molded position of said pawl and abutting against the adjacent portion of said strap in the strap-locking position of said pawl, said strap being deformable into a loop encircling a bundle of wires with the free end of said strap extending into said strap-receiving throat and through the opening in said frame and therebeyond, said row of abutments being disposed toward said tooth as said strap is tensioned about the bundle of wires to a tensioned condition and release of said strap causing at least one of said abutments firmly to engage said tooth and to shift said pawl to the strap-locking position thereof, said tooth in the final tensioned condition being disposed opposite the strap-bearing surface only and wedging the engaged portion of said strap against said strapbearing surface only, any force tending to withdraw said strap from within said strap-receiving throat in a strapwithdrawal direction serving to move the associated one of said abutments into more firm engagement with said tooth firmly to grip said strap between said strap-bearing surface and said pawl, whereby to prevent inadvertent withdrawal of said strap from said frame and thus to lock said strap in its tensioned condition about the bundle of wires.

14. A releasable cable tie to be tensioned about a bundle of wires and the like, said cable tie comprising an elongated flexible strap, a row of abutments disposed on one longitudinal surface of said strap and arranged transversely with respect thereto, a frame on one end of said strap and including an abutment wall and an end wall, said frame having an entry surface and an exit surface and an opening extending therethrough for receiving the other end of said strap, a rigid ledge on said end wall extending longitudinally therefrom toward said abutment wall and including a support surface disposed toward said entry surface, a pawl disposed within said frame in said strap-receiving opening and pivotally mounted on and integral with the support surface of said ledge, the longitudinal extent of said pawl at its juncture with said support surface being less than the longitudinal extent of said support surface, said abutment wall having a strap-bearing surface disposed toward said pawl and defining therewith a strap-receiving throat, a tooth on said pawl arranged transversely with respect thereto and disposed toward said abutment wall and shaped to engage said row of abutments on said strap, said strap being deformable into a loop encircling a bundle of wires with the free end of said strap extending into said strap-receiving throat and through the opening in said frame and therebeyond, said tooth being disposed toward said row of abutments as said strap is tensioned about the bundle of wires to a tensioned condition and release of said strap causing at least one of said abutments firmly to engage said tooth, said tooth in the final tensioned condition being disposed opposite the strap-bearing surface only and wedging the engaged portion of said strap against said strap-bearing surface only, any force tending to withdraw said strap from within said strap-receiving throat in a strap-loosening direction serving to move said tooth into more firm engagement with the engaged ones of said row of abutments firmly to grip said strap between said strap-bearing surface and said pawl, whereby to prevent inadvertent withdrawal of said strap from said frame and thus to lock said strap in its tensioned condition about the bundle of wires, and an extension on said pawl extending beyond said exit surface in all positions of said pawl for engagement by a user to move said pawl from the tensioned condition thereof to a release condition, said tooth in the release condition of said pawl being out of engagement with said row of abutments, thereby to allow withdrawal of said strap from said frame.

* * * * *

UNITED STATES PATENT OFFICE
CERTIFICATE OF CORRECTION

PATENT NO. : 3,908,233

DATED : September 30, 1975

INVENTOR(S) : Jack E. Caveney & Roy A. Moody

It is certified that error appears in the above-identified patent and that said Letters Patent are hereby corrected as shown below:

Column 3, line 13, after "abutments" insert --or--;

Column 5, line 14, after "topmost" insert --tooth--;

line 15, "belwo" should be --below--;

Column 9, line 2, "325" should be --355--;

line 50, "at" should be --a--; and

Column 12, line 44, "an" should be --and--

Signed and Sealed this sixth Day of January 1976

[SEAL]

Attest:

RUTH C. MASON
*Attesting Officer*

C. MARSHALL DANN
*Commissioner of Patents and Trademarks*